Patented July 11, 1950

2,514,380

UNITED STATES PATENT OFFICE 2,514,380

DIAMINES AND METHOD OF PRODUCTION

Robert Duschinsky, Essex Fells, N. J., assignor to Hoffmann-La Roche Inc., Nutley, N. J., a corporation of New Jersey No Drawing. Application December 26, 1946, Serial No. 718,625

5 Claims. (Cl. 260—570.9)

The present invention relates to new diamines, novel intermediates employed in the production of the new diamines, and to methods for the production of the diamines and their intermediates.

More particularly my invention relates to a new process for preparing diamines of the following formula which includes both known and unknown diamines:

(I)   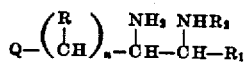

wherein Q stands for a phenyl or hydrogenated phenyl nucleus, R stands for H or OH, $R_1$ and $R_2$ stand for hydrogen and lower alkyl, and $n$ stands for 0 or 1. The phenyl and hydrogenated phenyl nucleus can contain substituents, as for example, hydroxy radicals, aralkoxy radicals, and acyloxy radicals.

The invention also relates to new diamines and their salts which, in the form of the free base, can be represented by the following formula:

(II)   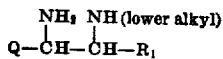

wherein Q stands for a phenyl or hydrogenated phenyl nucleus and $R_1$ stands for hydrogen and lower alkyl. The phenyl and hydrogenated phenyl nucleus can contain substituents, as for example, hydroxy radicals, aralkoxy radicals, and acyloxy radicals.

The compounds are useful as pharmaceuticals, having pressor effects combined with surprisingly low toxicity, and are also useful as intermediates for the manufacture of other chemicals.

According to my invention, compounds of type I can be prepared by catalytically reducing, as by catalytic hydrogenation, imidazolones of type (III) or in the form of their acylated derivatives and hydrolyzing the thus formed imidazolidones of type (IIIA), the hydrolysis being carried out under either acid or alkaline conditions. According to an alternative procedure one can start with the imidazolidones of type (IIIA), and hydrolyze these to form the diamines. The reactions involved can be represented by the following scheme:

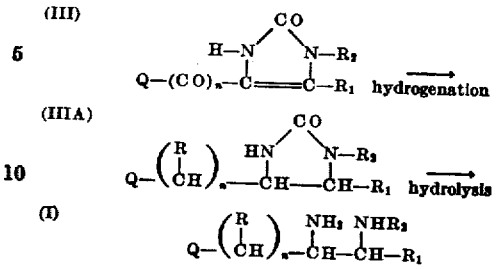

The symbols have the same significance as assigned thereto for Formula I above.

In this manner compounds of type I as illustrated by the following specifically named compounds are readily prepared.

1 - (3,4 - dihydroxyphenyl)-$N^2$-methyl-ethylenediamine.
1 - (3 - hydroxyphenyl)-$N^2$-methyl-ethylenediamine.
1-phenyl-$N^2$-methyl-1,2-propanediamine.
1-p-hydroxyphenyl-1,2-propanediamine.
1-cyclohexyl-1,2-propanediamine.
3-phenyl-1,2-propanediamine.
3-cyclohexyl-1,2-propanediamine.
3-phenyl-3-hydroxy-1,2-propanediamine.
3-cyclohexyl-3-hydroxy-1,2-propanediamine.
1-phenyl-2,3-butanediamine.
1-cyclohexyl-2,3-butanediamine.
1 - phenyl-1-hydroxy-2,3-butanediamine, and the salts of the above compounds with acids, such as the dihydrochlorides or the sulfates.

The imidazolones of type (III) where the $n$ of the $(CO)_n$ group is zero can readily be obtained by reacting aryl-$\alpha$-aminoalkyl-ketones or aryl-$\alpha$-alkyl-aminoalkyl-ketones with an alkali metal cyanate, the phenyl nucleus of the ketone being unsubstituted or substituted. The imidazolones of type (III) containing the $(CO)_n$ linkage where $n$ is 1 can be obtained according to the method described by Duschinsky and Dolan, J. Am. Chem. Soc. 67, 2079 (1945) and 68, 2350 (1946).

The following examples will serve to illustrate my invention.

EXAMPLE 1

1-methyl-4-(3-hydroxyphenyl)-2-imidazolone

A solution containing 10.08 grams of α-methyl-amino-m-hydroxy-acetophenone hydrochloride and 8.1 grams of potassium cyanate in 200 cc. of water was heated 20 minutes at 90 to 100° C. The crystallization of the imidazolone started after a few minutes. Cooling and acidifying with 10 cc. of 5 N hydrochloric acid yielded the crude product melting at 250–253° C. The product was recrystallized from ethanol and thus purified, the compound melted at 252–254° C.

EXAMPLE 2

1-methyl-4-(3-hydroxyphenyl)-2-imidazolidone

A mixture of 12.6 grams of the imidazolone described in Example 1, 5 grams of 3.5% palladium on charcoal catalyst and 70 cc. of acetic acid was hydrogenated for two hours at 50 lbs. pressure and a temperature of about 65° C. The solution, filtered from the catalyst, was concentrated to a syrup, which crystallized upon addition of 40 cc. of water. M. P. 162–164° C. After recrystallization from 7.5 volumes of water it melted at 163–165° C.

EXAMPLE 3

1-(3-hydroxyphenyl)-N²-methyl-ethylenediamine dihydrochloride 10.7 grams of the imidazolidone described in Example 2 were refluxed for five hours with 300 cc. of concentrated hydrochloric acid and 30 cc. of water. The solution was evaporated in vacuo and the resulting residue crystallized from 75 cc. of ethanol, in the form of colorless needles melting at 197–199° C. The product can be recrystallized practically without loss by dissolving in 10 volumes of methanol and addition of 30 volumes of ether, M. P. 199–200° C.

EXAMPLE 4

1-(3-hydroxyphenyl)-N¹N²-tetramethyl-ethylenediamine dihydrochloride

A mixture of 2.39 grams of the diamine described in Example 3, 1.68 grams of sodium bicarbonate, 38 cc. of formic acid and 4 cc. of aqueous formaldehyde (37%) was kept for 20 hours on a water bath. The yellowish solution was acidified with 5 cc. of concentrated hydrochloric acid and evaporated to dryness. The residue was taken up with ethanol, which dissolved the reaction product and left sodium chloride undissolved. The filtered solution gave upon addition of ether the dihydrochloride of the tetramethyldiamine. The product was purified by dissolution in ethanol and precipitation with ether or acetone. It decomposes at about 200° C.

EXAMPLE 5

1-methyl-4-(3,4-dihydroxyphenyl)-2-imidazolone

Solutions of 24.0 grams of 3,4-dihydroxyphenyl-α-methylamino-acetophenone hydrochloride in 500 cc. of water and of 18.0 grams (2 moles) of potassium cyanate in 550 cc. of water were mixed and refluxed for 1½ hours. Upon cooling and neutralization with 100 cc. of N hydrochloric acid the product crystallized in colorless needles, which were filtered and washed with 50 cc. of cold water. M. P. 269–271° C. (in vacuo). This crude product was used for the next step. It was purified by recrystallizing it from 200 parts water, and then drying at 110°. It melted in vacuo at 276–277° C. With ferric chloride it gave a purple coloration turning green on heating.

EXAMPLE 6

1-methyl-4-(3,4-dihydroxyphenyl)-2-imidazolidone

A mixture of 20.6 grams of the imidazolone described in Example 5, 20 grams of moist 3% palladium on charcoal catalyst (washed with acetic acid and prehydrogenated) and 130 cc. of glacial acetic acid was hydrogenated at 50 lbs. pressure and room temperature for 9½ hours. The solution filtered from the catalyst was evaporated in vacuo, and the residue was crystallized from 25 cc. water. Prismatic needles, which melted at 166.5–167° C. were obtained. After recrystallization from 30 parts of water the pure compound melting at 167–168.5° C. was obtained. On treatment with ferric chloride it gave a green coloration.

The compound is preferably hydrolyzed after protective benzylation of the hydroxy groups and the diamine formed subsequently debenzylated. The various steps involved are illustrated by the following examples.

EXAMPLE 7

1-methyl-4-(3,4-dibenzyloxy-phenyl)-2-imidazolidone

In a 3-neck flask provided with a stirrer, reflux condenser and a tube through which a slow stream of carbon dioxide was introduced, a mixture of 30.6 grams of the imidazolidone described in Example 6, 56 grams of benzyl chloride, 36.5 grams of anhydrous potassium carbonate, 4.4 grams of sodium iodide, and 200 cc. of 99% ethanol was stirred and refluxed by means of an oil bath heated to 215–220° C. After five hours, the excess benzyl chloride was eliminated by steam distillation. The benzyl ether separated as an oil, which solidified to a slightly yellowish crystalline mass and was washed with N sodium hydroxide in which it is quite insoluble, then with water and acetone. M. P. 125–128° C. The compound was recrystallized from ten volumes of ethanol; it yielded colorless needles melting at 128–129.5° C. and gave no ferric chloride reaction.

EXAMPLE 8

1-(3,4-dibenzyloxy-phenyl)-N²-methyl-ethylenediamine dihydrochloride

A mixture of 4 grams of the benzylated imidazolidone described in Example 7, 22 grams of sodium hydroxide dissolved in 22 cc. of water, and 100 cc. of ethanol was heated with shaking for 48 hours at 120° C. under hydrogen in a stainless steel-lined high-pressure autoclave. The slightly yellowish mixture was diluted with 30 cc. of water and evaporated in vacuo under nitrogen to a volume of 50 cc. The mixture was extracted four times with 50 cc. of ether. The extract was dried over potassium hydroxide, filtered and evaporated. A yellowish oil was obtained, which was dissolved in 30 cc. of N hydrochloric acid. The solution, which was Congo acid, was evaporated to dryness, and the residue was dissolved in 25 cc. of methanol. Gradual addition of 100 cc. of ether yielded colorless crystals, which were washed with acetone and ether. M. P. 184–185° C. (with some softening and resolidifying at 160° C.). Recrystallization by dissolving in seven parts of methanol and precipitation with 50 parts of ether did not affect the melting point. The salt was very soluble in water and insoluble in organic solvents. It gave no ferric chloride reaction.

EXAMPLE 9

1-(3,4-dihydroxyphenyl) - $N^2$-methyl-ethylenediamine dihydrochloride

To a suspension of 3 grams of moist 3% prehydrogenated palladium on charcoal in 100 cc. of methanol were added 4.35 grams of the compound described in Example 8. The mixture was hydrogenated at room temperature and atmospheric pressure. Two moles of hydrogen were absorbed. After addition of 1.0 cc. of 8 N ethanolic hydrochloric acid, the catalyst was filtered, and the liquid evaporated in vacuo under nitrogen, which was dissolved in 6 cc. of methanol. Gradual addition of 6 cc. of 8 N alcoholic hydrochloric acid and 6 cc. of acetone produced crystals, which were filtered and washed with acetone. M. P. 201–202° C. (with decomposition). Recrystallization by dissolving in 20 parts of boiling methanol and precipitation with 10 parts ethanolic hydrochloric acid yielded the purified compound, M. P. 202–203° C. (with decomposition).

The following examples will serve to illustrate the preparation of 1-phenyl-, and 1-cyclohexyl-1,2-propanediamines.

EXAMPLE 10

3,4-dimethyl-5-phenyl-2-imidazolone

A solution of 6.6 grams of α-methylaminopropiophenone hydrochloride in 150 cc. water was mixed and refluxed for 45 minutes with a solution of 5.4 grams of potassium cyanate in 150 cc. of water. Addition of 41.6 cc. of N hydrochloric acid and cooling gave the product in the form of needles melting in vacuo at 261–265° C. It can be recrystallized from 30 volumes of 50% ethanol.

EXAMPLE 11

3,4-dimethyl-5-phenyl-2-imidazolidone

A mixture of 5.41 grams of the imidazolone described in the foregoing example, 2.3 grams of 10% palladium on charcoal catalyst and 80 cc. acetic acid were hydrogenated at room temperature and atmospheric pressure. Uptake, 720 cc. in 2.5 hours. The residue obtained after evaporation of the filtrate was recrystallized from 100 cc. of water. It melted at 144–146° C. and after recrystallization from 20 volumes of water at 145–146° C.

EXAMPLE 12

1-phenyl-$N^2$-methyl-1,2-propanediamine dihydrochloride

A mixture of 4.5 grams of the imidazolidone described in Example 11 and 110 cc. of concentrated hydrochloric acid was autoclaved 14 hours at 130° C. Evaporating and crystallization of the residue from 50 cc. of ethanol gave needles melting in vacuo at 247–249° C. Evaporation of the mother liquor yielded a second crop melting at 242–244° C. 4.97 grams of the crude material were dissolved in 60 cc. of boiling methanol. Addition of 60 cc. of ether to the cooled solution produced crystals which were washed with 1:1 methanol-ether mixture. The purified product had a M. P. of 244.5–246° C.

EXAMPLE 13

4-methyl-5-p-hydroxyphenyl-2-imidazolone

To a prehydrogenated mixture of 20 grams of 3% palladium on charcoal, 100 cc. of ethanol, and 18.9 cc. of concentrated hydrochloric acid was added 19.43 grams of α-oximino-p-hydroxypropiophenone prepared according to Hartung, Munch, Miller and Crossley [J. Am. Chem. Soc. 53, 4156 (1931)]. Hydrogenation at room temperature and at about 40 lbs. pressure caused an uptake of 15.6 lbs. in 165 minutes. The solution filtered from the catalyst and containing the α-amino-p-hydroxypropiophenone thus formed was mixed with a solution of 17.6 grams of potassium cyanate in 100 cc. of water and concentrated in an open dish on a water bath to volume of 100 cc. (Temperature about 75° C., time one hour.) The crystallized imidazolone was washed with water, then with alcohol and finally with ether. Thus, a first crop, melting in vacuo at 352–354° C. and by concentration of the mother liquor a second crop, melting at about 335° C. was obtained. The latter was purified by dissolving in 23 cc. N sodium hydroxide and reprecipitating with hydrochloric acid to yield the crude compound melting at 346–358° C.

The crude product was purified by dissolving in 10 cc. water and 5 cc. of N sodium hydroxide and reprecipitating by addition of 5 cc. N hydrochloric acid to give the compound melting at 353–355° C.

EXAMPLE 14

4-methyl-5-p-hydroxyphenyl-2-imidazolidone 760 mg. of the imidazolone described in Example 13 were hydrogenated in 20 cc. of acetic acid in the presence of 1 gram of 3% palladium on charcoal. Uptake in 14 hours, 96 cc. (1 mole). The crude reaction product was crystallized from 35 cc. of water. It had a M. P. of 203–204° C. Recrystallization from 40 volumes water and sublimation at 220–240° C. and 0.08 mm. yielded the product with a M. P. of 208° C.

EXAMPLE 15

1-p-hydroxyphenyl-1,2-propanediamine dihydrochloride

A solution of 125 mg. of the imidazolidone described in Example 14, in 5 cc. of concentrated hydrochloric acid was refluxed 12 hours whereby crystallization occurred. Concentration to dryness and taking up with acetone gave short prisms which were recrystallized by dissolving in 4 cc. of methanol and 0.1 cc. water and addition of 20 cc. of acetone. M. P. in vacuo 282–285° C.

The hydrogenation of the 4-methyl-5-p-hydroxyphenyl-2-imidazolone, it was found, was facilitated by first acetylating the compound by refluxing with acetic anhydride to give a triacetylated imidazolone, which could readily be reduced to the corresponding imidazolidone, and hydrolyzed to give 1 - p - hydroxyphenyl - 1,2 - propanediamine dihydrochloride. This is illustrated by Examples 16–19.

EXAMPLE 16

1,3-diacetyl-4-methyl-5-p-acetoxyphenyl-2-imidazolone

A mixture of 5.7 grams of 4-methyl-5-p-hydroxyphenyl-2-imidazolone and 114 cc. of acetic acid anhydride was refluxed for 55 minutes. The resulting solution was evaporated to a syrup which was again refluxed with acetic anhydride and evaporated. The final residue crystallized upon addition of 30 cc. ether and cooling, M. P. 129–130° C. Upon recrystallization from 5 cc. methanol, the product melted at 132–133° C.

EXAMPLE 17

*1,3-diacetyl-4-methyl-5-p-acetoxyphenyl-2-imidazolidone*

4.4 grams of the imidazolone described in Example 16 were hydrogenated in a Parr bomb at room temperature and at about 40 lbs. pressure in 100 cc. of acetic acid, in the presence of 4.4 grams of 3% palladium on charcoal. The product was crystallized from 30 cc. ethanol, M. P. 134–135° C.

EXAMPLE 18

*4-methyl-5-p-hydroxyphenyl-2-imidazolidone*

When 318 mg. of the product described in Example 17 were heated on a water bath with 4 cc. of water, 2 cc. of ethanol and 5 cc. of N sodium hydroxide and the solution was acidified with hydrochloric acid, the deacetylated imidazolidone melting at 206–208° C. was obtained.

EXAMPLE 19

*1-p-hydroxyphenyl-1,2-propanediamine dihydrochloride*

A mixture of 2.31 grams imidazolidone described in Example 18, and 55 cc. of concentrated hydrochloric acid was refluxed in a nitrogen stream for two hours. Crystallization occurred in the hot solution after ½ hour refluxing.

After cooling the glittering platelets were filtered off and washed with acetone. They melted in vacuo at 287–290° C. The product can be recrystallized by dissolving in ten volumes water and reprecipitation with 20 volumes of concentrated hydrochloric acid.

The residue was boiled with 20 cc. of ethanol and gave upon cooling crystals melting in vacuo at 228–229° C., and after recrystallization from 40 volumes ethanol and sublimation at 150° C. (bath) and 0.1 mm., the product melting at 231–232° C.

B. From 4 - methyl - 5 - p - hydroxyphenyl - 2-imidazolone.

EXAMPLE 21

*1-cyclohexyl-1,2-propanediamine dihydrochloride*

A solution of 710 mg. of imidazolidone described in Example 20, in 15 cc. concentrated hydrochloric acid was refluxed for four hours. Upon evaporation to dryness and taking up with little methanol and acetone, crystals were obtained, which after dissolving in 5 cc. methanol and reprecipitation with 7 cc. acetone melted in vacuo at 299–300° C.

In preparing 1-phenyl-, and 1-cyclohexyl-2,3-butanediamines, there can be employed as a starting material 4-methyl-5-benzoyl-2-imidazolone (IV), prepared by Friedel-Crafts reaction of 4-methyl-2-imidazolone with benzoyl-chloride, as described by Duschinsky & Dolan, J. Am. Chem. Soc. 67, 2079 (1945). The hydrogenation of this compound takes different courses, depending on whether the imidazolone nucleus is or is not acetylated. (A) If the nucleus is not acetylated it resists hydrogenation until all other groups are completely reduced. (B) If the nucleus is acetylated, it is reduced simultaneously with the conversion of the keto group into a carbinol. In case (C) an acetylated intermediate is hydrogenated. The course of the reactions is indicated by the following schemes:

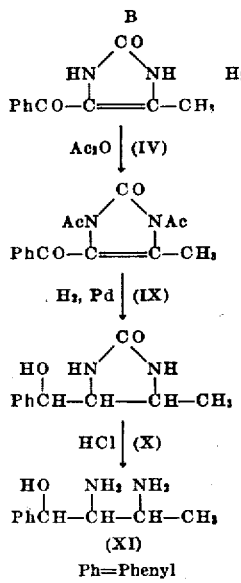
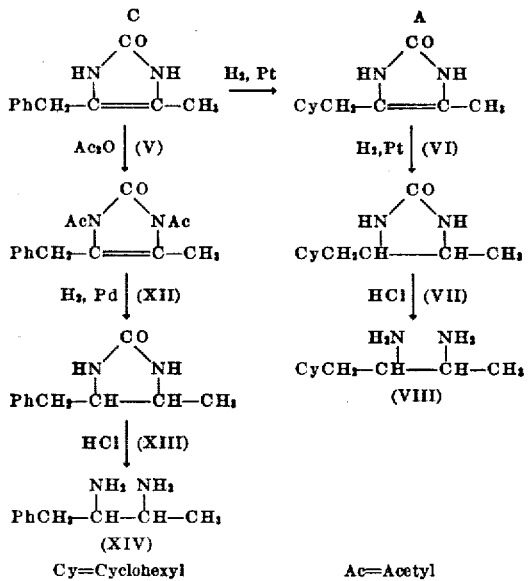

Ph=Phenyl  Cy=Cyclohexyl  Ac=Acetyl

EXAMPLE 20

*4-methyl-5-cyclohexyl-2-imidazolidone*

A. From 4-methyl-5-phenyl-2-imidazolone.

A prehydrogenated suspension of 1 gram platinum oxide catalyst in 70 cc. acetic acid and of 1.74 grams of 4-methyl-5-phenyl-2-imidazolone was hydrogenated at room temperature and atmospheric pressure. The uptake measured after two hours was 750 cc. and was not increased by further shaking or heating of the mixture. The catalyst and some insoluble material were filtered and the solution was evaporated in vacuo.

(A) Platinum catalyzed hydrogenation of (IV) leads through the intermediates (V) and (VI) to 4-methyl-5-hexahydrobenzyl-2-imidazolidone (VII). Hydrochloric acid hydrolysis of the latter gives the dihydrochloride of (VIII).

(B) Treatment of compound (IV) with acetic anhydride gives (IX). Hydrogenation of this diacetyl derivative with palladium on charcoal, followed by mild alkali hydrolysis, gives the imidazolidone (X). The latter can be hydrolyzed with concentrated hydrochloric acid to give the dihydrochloride of (XI).

(C) As already described, compound (IV)

yields on hydrogenation, 4-methyl-5-benzyl-2-imidazolone (V), which is acetylated to form the diacetyl derivative (XII). The latter gives upon hydrogenation followed by alkali hydrolysis, the imidazolidone (XIII). When the hydrogenation mixture is hydrolyzed with hydrochloric acid, the diamine (XIV) results, which is extracted and converted into the corresponding sulfate with sulfuric acid.

The following examples will serve to illustrate the production of 1-phenyl-, and 1-cyclohexyl-2,3-butanediamines:

EXAMPLE 22

*1-cyclohexyl-2,3-butanediamine dihydrochloride (VIII)*

664 mg. of 4-methyl-5-hexahydrobenzyl-2-imidazolidone (VII) were refluxed with 40 cc. N hydrochloric acid for 48 hours. The evaporated solution gave a yellowish syrup which was dissolved in 4 cc. of ethanol. Gradual addition of dioxane gave crystals melting in vacuo above 300° C. The product was purified by dissolving in ethanol and precipitating with ether, M. P. 306–309° C. (in vacuo).

EXAMPLE 23

*4 - methyl - 5 - α-hydroxybenzyl-2-imidazolidone (X)*

572 mg. of 1,3-diacetyl-4-methyl-5-benzoyl-2-imidazolone (IX) were hydrogenated at room temperature and atmospheric pressure with 1 gram of 10% palladium on charcoal catalyst in 15 cc. of acetic acid. After two hours, the hydrogenation came to a standstill with an uptake of 97.5 cc. The oily residue, obtained by filtering off the catalyst and evaporating the acetic acid, was dissolved in 6 cc. of ethanol and hydrolyzed by allowing it to stand with 7.5 cc. of N sodium hydroxide for two hours. The solution was neutralized to Methyl Orange with hydrochloric acid and evaporated to dryness. The residue was extracted with ethanol. Evaporation of the ethanolic extract and treatment of the residue with water gave crystals which were purified by sublimation at 200° C. (bath) and 0.4 mm., M. P. 210–212° C. 1-phenyl-1-hydroxy-2,3-butanediamine is obtainable from this compound by hydrolysis. However, as shown in Example 24, the hydrolysis can be carried out without previous isolation of the compound.

EXAMPLE 24

*1-phenyl-1-hydroxy - 2,3 - butanediamine sulfate (XI)*

To a prehydrogenated suspension of 2.86 grams of 10% palladium on charcoal catalyst in 40 cc. of acetic acid were added 5.72 grams of 1,3 - diacetyl - 4 - methyl - 5 - benzoylimidazolone (IX). The mixture was hydrogenated at room temperature and 41 pounds pressure for 14 hours. Uptake, 3.6 pounds. Concentration in vacuo gave a colorless syrup which was refluxed with 30 cc. of hydrochloric acid for 5.5 hours. The evaporated hydrolysate was taken up with 25 cc. of 40% sodium hydroxide and extracted five times with 40 cc. of ether. The extract was dried over potassium hydroxide and evaporated to a viscous oil which was dissolved in 15 cc. of ethanol. Addition of 3 cc. of 10 N sulfuric acid and 15 cc. of ethanol gave crystals which were washed with alcohol and ether. The product was recrystallized by dissolving in very little water and precipitating with methanol and ether, M. P. 254–256° C.

EXAMPLE 25

*1,3-diacetyl-4-methyl-5-benzyl-2-imidazolone (XII)*

4 - methyl-5-benzyl - 2 - imidazolone V (7.61 grams), was refluxed ½ hour with 60 cc. of acetic anhydride. The mixture was evaporated to a syrup, again refluxed with acetic anhydride and then evaporated. The final residue was crystallized from 20 cc. of ethanol, yielding the diacetyl compound (XII) in the form of needles melting at 73–75.5° C. After sublimation at 75–80° (bath) and 0.2 mm. the purified compound melted at 74.5–76° C.

EXAMPLE 26

*4-methyl-5-benzyl-2-imidazolidone (XIII)*

The diacetyl compound XII (1.36 grams) was hydrogenated with 650 mg. of 10% palladium on charcoal catalyst in 15 cc. of acetic acid at room temperature and atmospheric pressure. The uptake came to a standstill after absorption of one mole. The residue obtained from the filtered and evaporated solution was hydrolyzed by allowing it to stand for 20 minutes with 10 cc. N sodium hydroxide which was neutralized with 10 cc. of N hydrochloric acid. The solution was evaporated to dryness, the residue extracted with ethanol, and the extract again evaporated to dryness. Treatment of the final residue with ether gave crystals, which were purified by recrystallization from water, or by sublimation at 140° C. (bath) and 0.6 mm. M. P. 134–135°.

EXAMPLE 27

*1-phenyl-2,3-butanediamine sulfate (XIV)*

A mixture of 4.25 grams of the diacetyl compound (XII), 4.25 grams 10% palladium on charcoal and 40 cc. acetic acid was hydrogenated 65 hours. Evaporation in vacuo gave a crystalline mass which was refluxed for seven hours with 30 cc. of concentrated hydrochloric acid. The hydrochloric acid was thoroughly evaporated in vacuo. The residue was taken up with 30 cc. of 40% sodium hydroxide and extracted five times with 15 cc. of ether. The extract was dried over potassium hydroxide. After evaporation of the ether, a yellowish oil resulted which was dissolved in 30 cc. of ethanol and acidified with 2.4 cc. of 10 N sulfuric acid. The obtained crystals were washed with ethanol and ether, M. P. 273–276° C.

The crude compound was dissolved in 1 cc. of warm water, 4 cc. ethanol were added and the formed precipitate redissolved by heating. Cooling gave short needles which were washed with 80% ethanol, then absolute ethanol and ether, and were dried at 60° C. in vacuo. The purified compound melted at 274–277° C.

In a similar manner there can be obtained 1-phenyl-, and 1-cyclohexyl-2,3-butanediamines in which the phenyl and cyclohexyl radical is substituted as by hydroxy; alkyl, such as methyl, ethyl, propyl, isopropyl, and the like; or by acyloxy as for example acetyloxy, propionyloxy, and the like.

By employing 4(or 5)-benzoyl-2-imidazolone [described by Duschinsky and Dolan, J. A. C. S. 68, 2350 (1946)] as the starting material instead of 4-methyl-5-benzoyl-2-imidazolone, the hydrogenation of the former compound and its 1,3 diacetyl derivatives takes courses corresponding in general to courses A, B and C for the hydrogenation of 4-methyl-5-benzoyl-2-imidazolone. Accordingly, by following a procedure similar to that of Examples 22–27, but according to the following scheme, 3-phenyl-, 3-phenyl-3-hydroxy-, 3-cyclohexyl- and 3-cyclohexyl-3-hydroxy-1,2-propanediamines can be prepared.

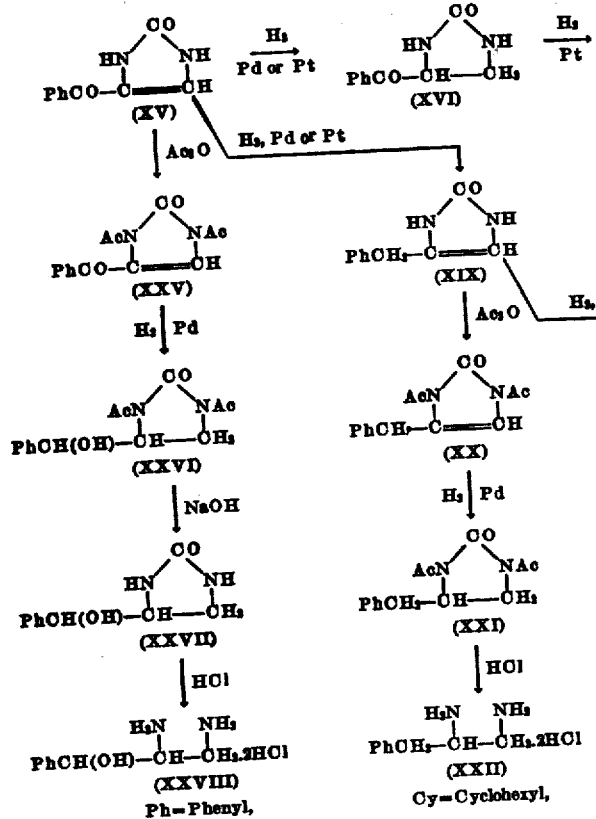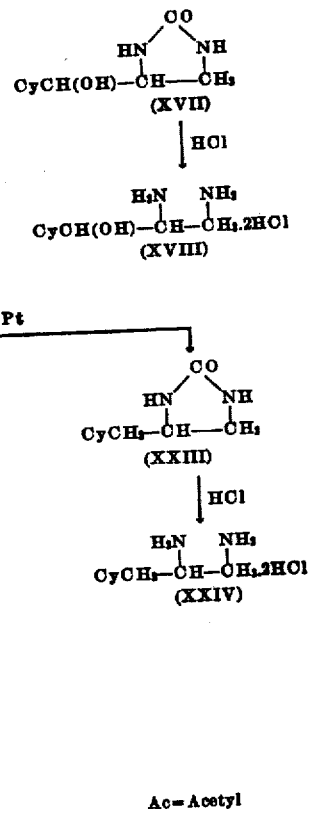

Ph = Phenyl, Cy = Cyclohexyl, Ac = Acetyl

Platinum catalyzed hydrogenation of (XV) gave a mixture of two imidazolidones: (a) probably through the intermediate (XVI) to give 4-cyclohexylmethyl - α - hydroxy - 2-imidazolidone (XVII) and (b) through (XIX) to give 4-cyclohexylmethyl - 2-imidazolidone (XXIII), which were separated by their different solubilities in alcohol, and after separation were hydrolyzed to 3-cyclohexyl-3-hydroxy-1,2-propanediamine dihydrochloride (XVIII) M. P. 280–282° C. and 3-cyclohexyl-1,2-propanediamine dihydrochloride (XXIV) M. P. 306–309° C.

Acetylation of XV gave 1,3-diacetyl-4-benzoyl-2-imidazolone (XXV) which on hydrogenation formed 1,3-diacetyl-4-α-hydroxybenzyl-2-imidazolidone (XXVI). This was hydrolyzed with alkali, such as sodium hydroxide, to give the deacetylated imidazolidone, 4-α-hydroxybenzyl-2-imidazolidone (XXVII) which upon acid hydrolysis gave 3-phenyl-3-hydroxy-1,2-propanediamine dihydrochloride, M. P. 224–225° C.

Compound XV on palladium catalyzed hydrogenation yielded also 4(or 5)-benzyl-2-imidazolone (XIX), which upon acetylation gave 1,3-diacetyl-4(or 5)-benzyl-2-imidazolone (XX). This on hydrogenation resulted in the corresponding imidazolidone (XXI) which on deacetylation by alkali hydrolysis, followed by acid hydrolysis, yielded 3-phenyl-1,2-propanediamine dihydrochloride XXII, M. P. 252–254° C.

The preparation of these 1,2-propanediamines is illustrated by the following examples:

EXAMPLE 28

4-cyclohexylmethyl-2-imidazolidone (XXIII) and 4-cyclohexylmethyl-α-hydroxy-2-imidazolidone (XVII)

A mixture of 3.76 grams of 4(or 5)-benzoyl-2-imidazolone (XV), 3.76 grams of prehydrogenated platinum catalyst and 120 cc. of acetic acid was hydrogenated for fifteen and one-half hours at room temperature and at about 50 lbs. pressure. The filtered solution was evaporated to a syrup and the acetic acid eliminated by repeatedly taking up the residue in water and evaporating in vacuo. The final residue, treated with 20 cc. of water gave a crystalline material melting between 150 and 170° C. Recrystallization from 30 cc. of boiling ethanol and cooling in an ice bath resulted in crystals melting at 203–210° C. Two further recrystallizations from ethanol raised the melting to 224–226° C. The product which can also be purified by sublimation in vacuo (200–215° C. bath temperature and 0.08 mm.) can be represented by formula (XVII).

The mother liquor of the first recrystallization gave upon evaporation to about 4 cc. and addition of 20 cc. of water crystals melting at 147–149° C. Recrystallization from 50 cc. of boiling water gave 4 - cyclohexylmethyl - 2-imidazolidone (XXIII), M. P. 158–159° C.

EXAMPLE 29

3-cyclohexyl-3-hydroxy-1,2-propanediamine dihydrochloride (XVIII)

850 mg. of compound (XVII) was refluxed with 25 cc. of concentrated hydrochloric acid for five hours. Upon cooling, the dihydrochloride of (XVIII) crystallized. A second crop was obtained by concentrating to 10 cc. and addition of 6 cc. 10 N alcoholic hydrochloric acid, M. P. 277–278° C. Recrystallization by dissolving in 10 cc. of 90% methanol and addition of 10 cc. 10 N alcoholic hydrochloric acid gave the product (XVIII) with the melting point of 282-283° C.

EXAMPLE 30

*Tribenzoyl derivative of 3-cyclohexyl-3-hydroxy-1,2-propanediamine dihydrochloride (XVIII)*

To a suspension of 150 mg. of 3-cyclohexyl-3-hydroxy-1,2-propanediamine dihydrochloride in 3.5 cc. pyridine there was added 0.6 cc. of benzoyl chloride. Heating for five minutes on a water bath produced complete dissolution. Addition of 10 cc. of water to the cooled reaction mixture precipitated an oil which was separated and washed with sodium bicarbonate solution. Upon washing the oil with a little alcohol, short prisms were obtained which were recrystallized from ethanol and melted at 200.5-201° C.

EXAMPLE 31

*3-cyclohexyl-1,2-propanediamine dihydrochloride (XXIV)*

860 mg. of 4-cyclohexylmethyl-2-imidazolidone were refluxed with 25 cc. of concentrated hydrochloric acid for four hours. The dihydrochloride was isolated in the same manner as was compound XVIII and the product had a M. P. of 305-308° C. Recrystallization by dissolving in 20 cc. of methanol and precipitation by 10 cc. of 10 N alcoholic hydrochloric acid gave the compound XXIV with a melting point of 306-309° C. (in vacuo).

EXAMPLE 32

*1,3-diacetyl-4(or 5)-benzyl-2-imidazolone (XX)*

A mixture of 1.35 grams of 4(or 5)-benzyl-2-imidazolone (XIX) and 13.5 cc. of acetic anhydride was refluxed for ½ hour and evaporated to a syrup which was again refluxed with acetic anhydride and evaporated. The final residue was crystallized from 5 cc. of ethanol, giving a product with M. P. of 85-87° C. The substance can be sublimed at 100-110° C. (bath temperature at 0.9 mm.).

EXAMPLE 33

*1,3-diacetyl-4(or 5)-benzyl-2-imidazolidone (XXI)*

A solution of 0.98 gram of the imidazolone described in Example 32, in 10 cc. of acetic acid was hydrogenated in the presence of about one gram of 3.5 per cent palladium on charcoal catalyst. The uptake stopped in 90 minutes with one mol absorbed. The filtered solution was exaporated and the residue crystallized from 10 cc. of ethanol. The substance had a M. P. of 82-83° C. An admixture of the substance with the starting material melted at about 65° C. The substance can be recrystallized from ethanol.

EXAMPLE 34

*3-phenyl-1,2-propanediamine dihydrochloride (XXII)*

700 mg. of the imidazolidone described in Example 33 were refluxed for one and one-half hours with 15 cc. of concentrated hydrochloric acid. Evaporation, taking up with methanol, and precipitation with ether produced crystals melting at 252-254° C.

EXAMPLE 35

*1,3-diacetyl-4(or 5)-α-hydroxybenzyl-2-imidazolidone (XXVI)*

4.1 grams of 1,3-diacetyl-4(or 5)-benzoyl-2-imidazolone were hydrogenated at 45 lbs. pressure in 40 cc. of acetic acid for thirty minutes and in the presense of 2.2 grams of 10 per cent palladium on charcoal catalyst. The filtered and evaporated solution gave, upon addition of 20 cc. of ethanol, crystals melting at 217-218° C. and after recrystallization from 50 volumes of ethanol, melting at 223° C.

EXAMPLE 36

*4(or 5)-α-hydroxybenzyl-2-imidazolidone (XXVII)*

A mixture of 10.15 grams of 1,3-diacetyl-4(or 5)-benzoyl-2-imidazolone (XXV), 120 grams of acetic acid and about 10 grams of moist 3.5 per cent palladium on charcoal catalyst was hydrogenated for 16 hours at 42 lbs. pressure. The filtered solution was concentrated and freed of acetic acid by evaporation with ethanol. A semi-crystalline syrup resulted which was deacetylated by heating for three minutes at 80° C. with 25 cc. of ethanol and 100 cc. of N-sodium hydroxide. Upon addition of 23.5 cc. of 4.65 N-hydrochloric acid, the imidazolidone crystallized. Evaporation of the mother liquors yielded a second crop. The crude product obtained could be further purified by sublimation in vacuo at 0.1 mm. and 200-205° C. (bath temperature). The purified product has a M. P. of 192.5-194° C.

EXAMPLE 37

*3-phenyl-3-hydroxy-1,2-propanediamine dihydrochloride (XXVIII)*

Three grams of 4(or 5)-α-hydroxybenzyl-2-imidazolidone (XXVII) and 90 cc. of concentrated hydrochloric acid were refluxed for two hours. The solution was evaporated in vacuo and repeatedly taken up with ethanol and evaporated. The final residue was dissolved in 15 cc. of ethanol, then 7 cc. of ether and 2 cc. of 10 N alcoholic hydrochloric acid were added. Upon standing in the cold the crystalline diamine dihydrochloride was obtained. The crude product was recrystallized by dissolving it in 30 cc. of hot methanol and adding 30 cc. of ether and a small amount of alcoholic hydrochloric acid. The purified product had a M. P. of 224-225° C. This compound can also be obtained by hydrolysis of compound (XXVI) described in Example 35.

Any of the diamines prepared as described above can be readily alkylated or acylated in their amino and hydroxy groups as, for example, methylated, ethylated, benzylated, acetylated, benzoylated or carbamylated.

This application is a continuation-in-part of my copending United States patent applications Serial No. 607,915, filed July 30, 1945, United States Patent No. 2,441,933, and Serial No. 654,509, filed March 14, 1946, United States Patent No. 2,441,935.

I claim:

1. A compound of the group consisting of 1-(3,4-dihydroxyphenyl)-N²-methyl-ethylenediamine, 1-(3-hydroxyphenyl)-N²-methyl-ethylenediamine, and the salts thereof.

2. 1-(3,4-dihydroxyphenyl)-N²-methyl-ethylenediamine and the salts thereof.

3. 1-(3,4-dihydroxyphenyl)-N²-methyl-ethylenediamine dihydrochloride.

4. 1-(3-hydroxyphenyl)-N²-methyl-ethylenediamine and the dihydrochloride thereof.

5. The process which comprises hydrolyzing 1-methyl-4-(3,4-dibenzyloxyphenyl)-2-imidazolidone under alkaline conditions to form 1-(3,4-dibenzyloxyphenyl)-N²-methyl-ethylenediamine, and debenzylating the last mentioned compound by catalytic hydrogenation to form 1-(3,4-dihydroxyphenyl)-N²-methyl-ethylenediamine.

ROBERT DUSCHINSKY.

REFERENCES CITED

The following references are of record in the file of this patent:

UNITED STATES PATENTS

| Number | Name | Date |
|---|---|---|
| 1,051,577 | Grether | Jan. 28, 1913 |

FOREIGN PATENTS

| Number | Country | Date |
|---|---|---|
| 13,600 | Great Britain | A. D. 1907 |

OTHER REFERENCES

Franchimont et al., "Rec. trav. chim." 1, pages 236-254 (1888).

Froentjis et al., "Rec. trav. chim." vol. 62, pp. 723-728 (1943).